United States Patent [19]

Kotani

[11] Patent Number: 5,838,925
[45] Date of Patent: Nov. 17, 1998

[54] METHOD AND APPARATUS FOR TRANSMISSION OF COMPRESSED PICTURE DATA

[75] Inventor: Hiroki Kotani, Tokyo, Japan

[73] Assignee: Sony Corporation, Tokyo, Japan

[21] Appl. No.: 624,548

[22] PCT Filed: Aug. 25, 1995

[86] PCT No.: PCT/JP95/01698

§ 371 Date: Apr. 15, 1996

§ 102(e) Date: Apr. 15, 1996

[87] PCT Pub. No.: WO96/07273

PCT Pub. Date: Mar. 7, 1996

[30] Foreign Application Priority Data

Aug. 26, 1994 [JP] Japan .................................. 6-202110

[51] Int. Cl.⁶ .............................. H04N 7/48; H04N 7/50
[52] U.S. Cl. .............................. 395/200.77; 395/200.66; 348/404; 348/412; 348/415; 348/715; 386/109; 386/111; 386/112
[58] Field of Search .................................. 348/401, 405, 348/409, 404, 415, 400, 416, 419, 411, 420, 412, 423, 18–19, 715, 705, 700; 386/111, 112, 68, 95, 124, 109; 395/200.77; 364/715.02; 341/60; 345/202

[56] References Cited

U.S. PATENT DOCUMENTS

| | | | |
|---|---|---|---|
| 5,317,397 | 5/1994 | Odaka et al. ............................ | 348/416 |
| 5,386,234 | 1/1995 | Veltman et al. ......................... | 348/409 |
| 5,412,428 | 5/1995 | Tahara ..................................... | 348/396 |
| 5,488,570 | 1/1996 | Agarwal .................................. | 348/396 |
| 5,490,247 | 2/1996 | Tung et al. .............................. | 345/501 |
| 5,506,954 | 4/1996 | Arshi et al. ......................... | 395/200.34 |
| 5,510,840 | 4/1996 | Yonemitsu et al. ..................... | 348/402 |
| 5,511,003 | 4/1996 | Agarwal ............................ | 395/200.34 |
| 5,539,466 | 7/1996 | Igarashi et al. ......................... | 348/401 |
| 5,550,756 | 8/1996 | Ohmi et al. ......................... | 395/200.77 |
| 5,602,592 | 2/1997 | Mori et al. .............................. | 348/415 |
| 5,644,506 | 7/1997 | Okazaki et al. ................... | 395/200.76 |
| 5,663,763 | 9/1997 | Yagasaki et al. ....................... | 348/405 |

FOREIGN PATENT DOCUMENTS 54-126418  10/1979  Japan .
5-111012   4/1993   Japan .

*Primary Examiner*—James P. Trammell
*Assistant Examiner*—Cuong H. Nguyen
*Attorney, Agent, or Firm*—Frommer Lawrence & Haug LLP; William S. Frommer

[57] ABSTRACT

In this invention, an approach is employed to transmit as a data train in transmitting every frame picture data compressed by using frame correlation and compressed picture data necessary for decoding the corresponding frame in the data train in each of the respective frames and copying compressed picture data of sum sets of compressed picture data included within the respective frames into the respective frames. Thus, in accordance with this invention, in the case where transmission of compressed picture data is carried out in frame units having undergone switching, there is no possibility that degradation of the picture quality has taken place.

7 Claims, 8 Drawing Sheets

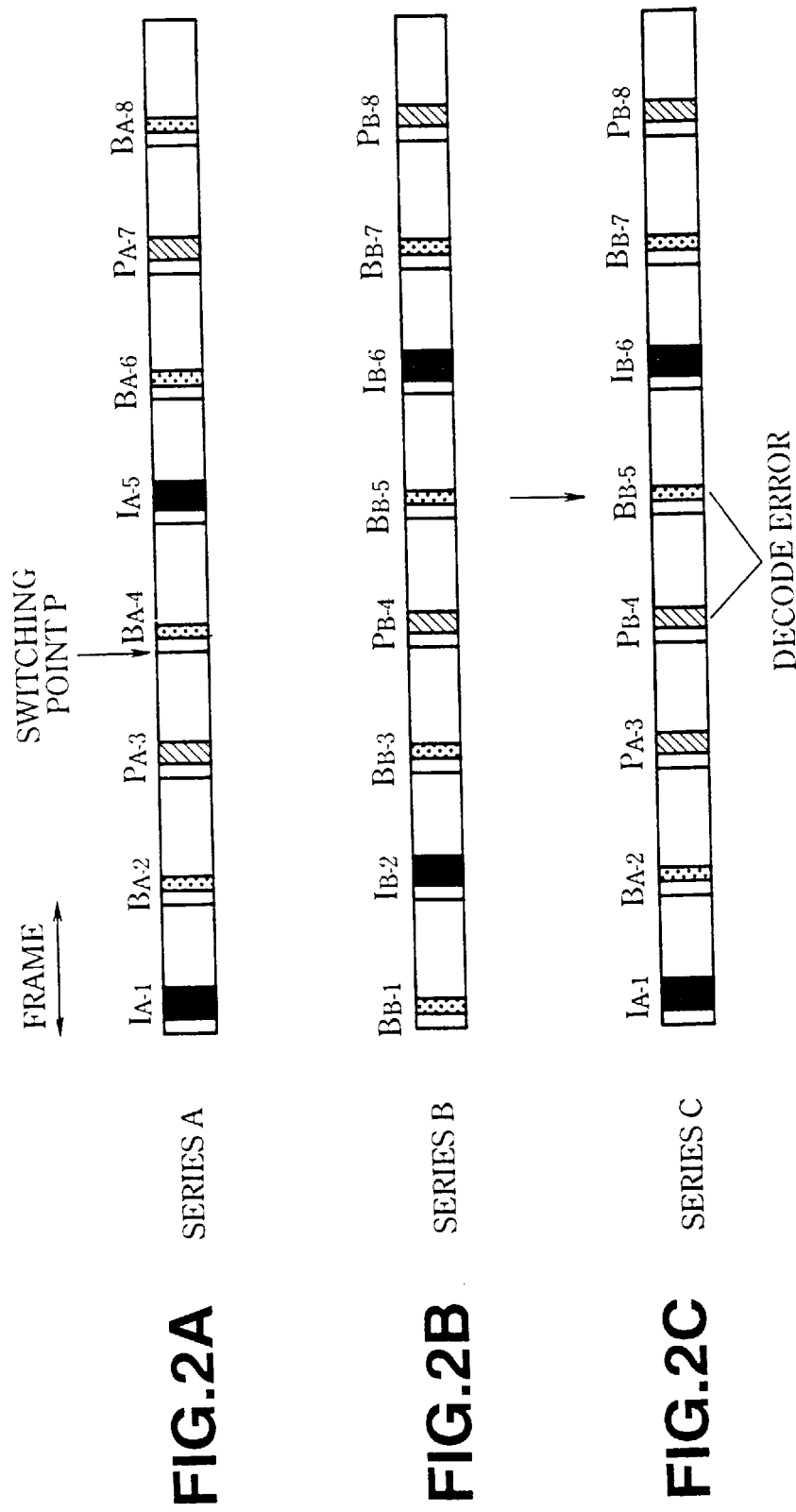

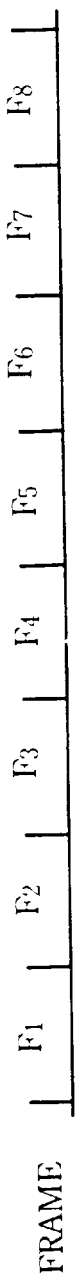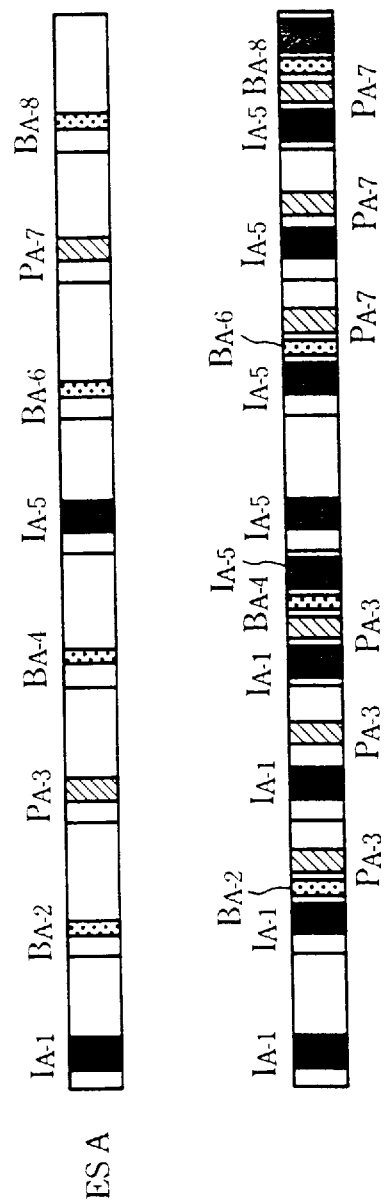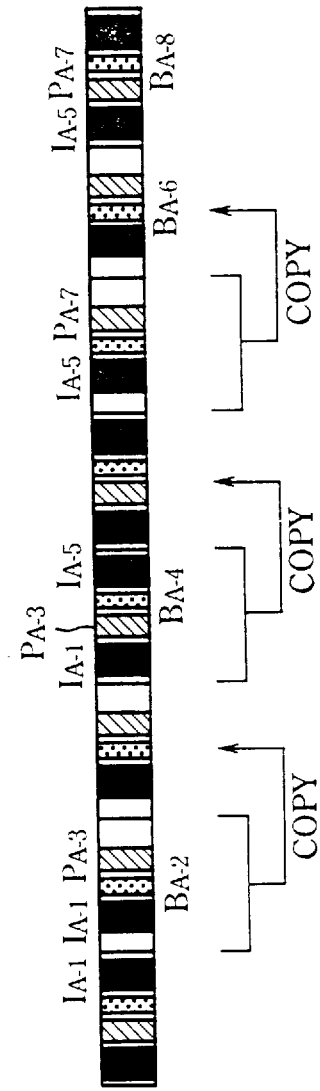
FIG.3A  FRAME
FIG.3B  SERIES A
FIG.3C
FIG.3D

FIG.5A FRAME
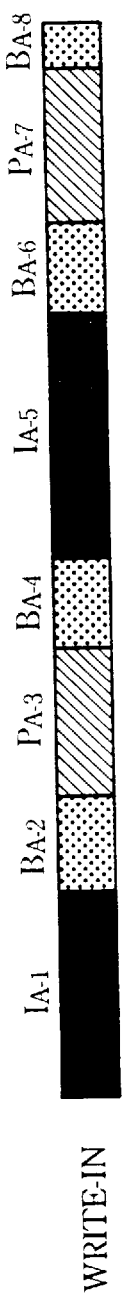
FIG.5B WRITE-IN
FIG.5C READ-OUT
FIG.5D READ-OUT

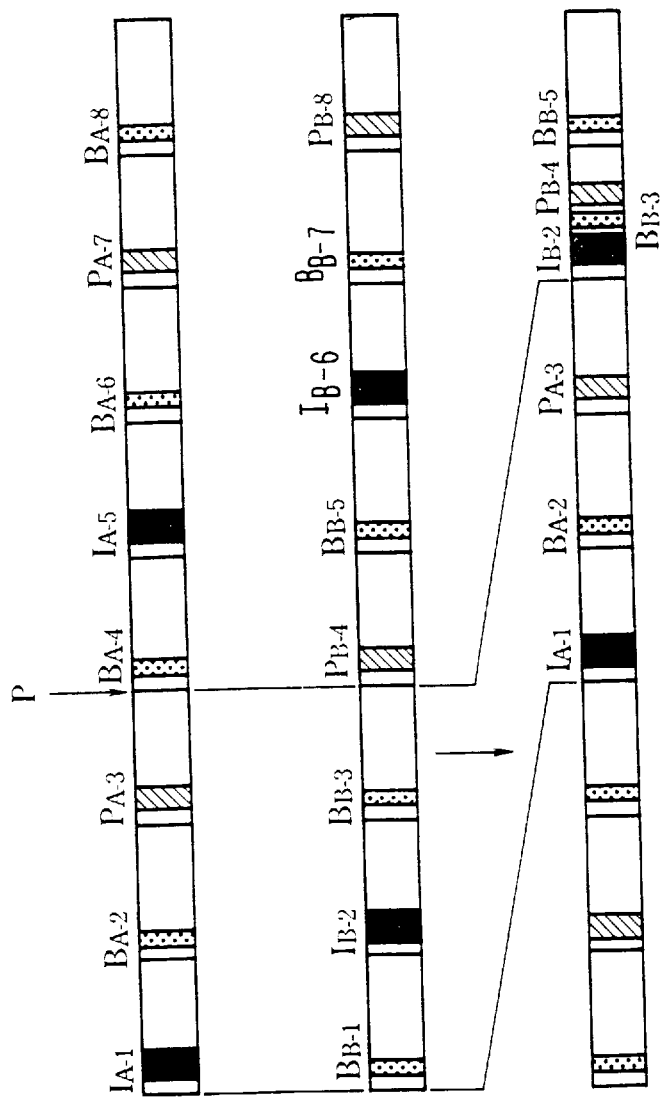

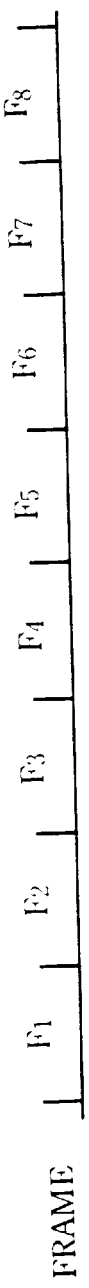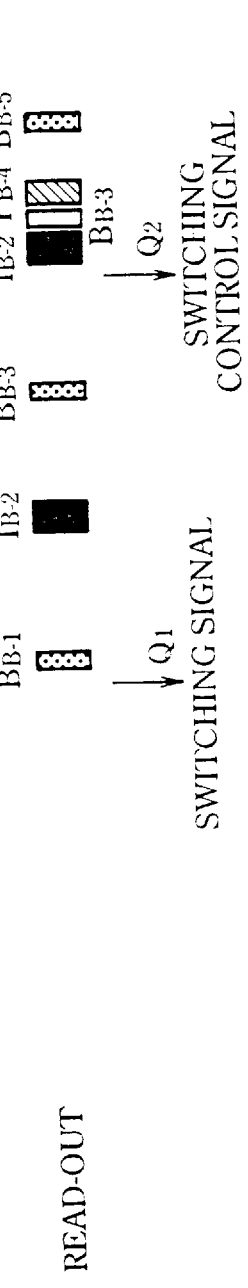

METHOD AND APPARATUS FOR TRANSMISSION OF COMPRESSED PICTURE DATA

TECHNICAL FIELD

This invention relates to a compressed picture data transmission method and a compressed picture data transmission apparatus for carrying out a plurality of series of compressed picture data.

BACKGROUND ART

In order to efficiently carry out compression of picture data, there has been employed a method of allowing pictures (pictorial images) of respective frames to be any one of three kinds of pictures: an I picture (Intra-coded Picture), a P picture (Predictive coded Picture) or B picture (Bidirectionally predictive coded Picture) where frame pictures are combined of these three pictures to compression-encode picture data. Data of an I picture is picture data compressed only by frame picture which is subject to encoding (hereinafter referred to as a corresponding frame picture depending upon circumstances), data of P picture is picture data compressed on the basis of a corresponding frame picture and frame picture of an I picture earlier than the corresponding frame picture and nearest thereto, and data of a B picture is picture data compressed on the basis of pictures of three frames in the total of corresponding frame picture, and frame pictures of I picture or P picture before and after the corresponding frame picture and respectively nearest thereto.

For example, in the case where a data train which has been encoded as shown in FIG. 1 is caused to undergo transmission in frame units, compressed picture (pictorial image) data is caused to be a data train as indicated by the series A of FIG. 2A. In the case where a data train is obtained by compressing data of a picture (pictorial image) different from the picture indicated by the data train of the series A which is now assumed to be series B as shown in FIG. 2B, and the series A and the series B are caused to undergo frame synchronization to carry out switching from the series A to the series B at the switching point P of the fourth frame, the data train of the series C as shown in FIG. 2C is obtained.

Meanwhile, since frame picture $P_{B-4}$ immediately after the switching point P within the series C shown in FIG. 2C cannot be correctly decoded when decoding is implemented and because frame picture $I_{B-2}$ when picture data is encoded is missing. Moreover, since frame picture $B_{B-5}$ subsequent to the frame picture $P_{B-4}$ is decoded by using frame picture $P_{B-4}$ in which decode error (error in decoding) has taken place, decode error will also take place in this case. Although the way of generation of decode error changes by phase and switching point between two series, in the case where switching between two series is carried out at a predetermined switching point as described above, occurrence of the decode error cannot be avoided. Ordinarily, decoding is implemented to compress picture data to carry out switching in the area of the decoded picture signal. In this case, however, since decoding and encoding are repeated, picture quality is increasingly deteriorated in every repetition. In addition, the hardware configuration needed becomes large.

In view of actual circumstances as described above, this invention contemplates providing a compressed picture data transmission method and a compressed picture data transmission apparatus which can carry out switching between the data trains of the plural series without allowing the picture quality to be deteriorated.

DISCLOSURE OF THE INVENTION

In order to solve the above-described problems, a compressed picture data transmission method according to this invention is characterized in that, in carrying out every frame, transmission of picture data is compressed by using frame correlation (hereinafter referred to as compressed picture data). The compressed picture data necessary for decoding compressed picture data that is caused to undergo transmission (or transmitted) every frame and is caused to undergo transmission at the same time within the same frame as that of the compressed picture data caused to undergo transmission every frame.

Moreover, the compressed picture data transmission method according to this invention is characterized in that, in plural successive frames, compressed picture data of the sum sets of compressed picture data included within the respective frames are copied into the respective plural successive frames to carry out transmission.

Further, a compressed picture data transmission method according to this invention is characterized in that, in carrying out switching between two series of picture data compressed by using frame correlation to conduct transmission, in the respective data trains before and after a switching point at which switching between two series is carried out, compressed picture data necessary for decoding compressed picture data of respective frames is caused to undergo transmission after having undergone switching are inserted into the respective data trains of the two series which have been caused to undergo switching.

In this case, compressed picture data necessary for decoding compressed picture data are respectively allocated within respective one frame before and after the switching point.

Moreover, a compressed picture data transmission apparatus according to this invention comprises a decoder adapted so that first and second picture signals compressed by using frame correlation are inputted to judge the kinds of the first and second picture signals; first and second memories for respectively temporarily holding the first and second picture signals; control means for controlling read-out operation of the first and second picture signals from the first and second memories on the basis of the kinds of the first and second picture signals judged by a switching signal and the decoder; and switching means for carrying out, on the basis of the switching signal, switching between the first and second picture signals which have been read out from the first and second memories to output the picture signal obtained by switching.

In this case, the control means is characterized in that in the case where the first and second picture signals at a switching point which the switching signal indicates is decoded; it is then judged by the decoder that a picture signal before or after the switching point is the necessary kind of signal to control the memories so as to add to the first and second picture signals at the switching point, the picture signal necessary for decoding and for reading the signals out from the memories.

Moreover, the control means is characterized in that in the case where the first and second picture signals are inputted to every respective frame and to the first and second memories; the actual means controls the memories so as to add to each of the frames of the first and second picture signals at the switching point a picture signal or signals necessary in decoding corresponding to one of the first and second picture signals to read them out from the memories.

Further, in this invention, in the case where transmission of compressed picture data using frame correlation is carried out, only compressed picture data necessary for decoding is caused to be included in every respective frame, or the compressed picture data of the sum sets of the compressed picture data are included within respective frames and are copied every respective frame as compressed picture data necessary for decoding.

In addition, in this invention, in the case where switching between series of compressed picture data is carried out to conduct transmission thereof, within the respective data trains before and after the switching point, compressed picture data necessary for decoding compressed picture data of respective frames is caused to undergo transmission (or transmitted) after having undergone switching are inserted into the respective data trains before and after the switching point.

BRIEF DESCRIPTION OF THE DRAWINGS

FIGS. 2A, 2B and 2C are views for explaining switching between series of compressed picture data.

FIGS. 3A, 3B, 3C and 3D are views for explaining a first compressed picture data transmission method according to this invention.

FIGS. 5A, 5B, 5C and 5D are views showing write-in and read-out timings with respect to memory of the compressed picture data shown in 3A, 3B, 3C and 3D.

FIGS. 6A, 6B, and 6C are views for explaining a second compressed picture data transmission method according to this invention.

FIGS. 8A, 8B, 8C, 8D and 8E are views showing write-in and read-out timings with respect to memories of the compressed picture data shown in FIG. 6.

BEST MODE FOR CARRYING OUT THE INVENTION

Figure 1:
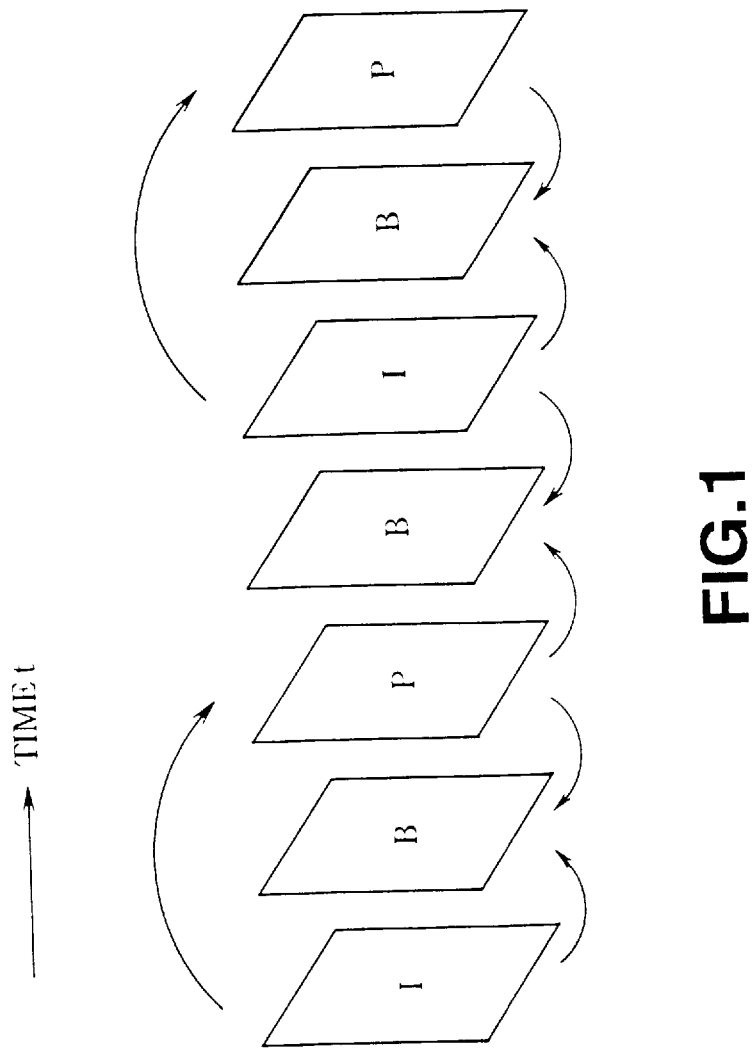
FIG. 1 is a view for explaining a picture compression method utilizing the frame correlation.

Preferred embodiments of this invention will now be described with reference to the attached drawings. FIGS. 3A to 3D are view for explaining a first compressed picture data transmission method according to this invention.

In order that switching between two series of compressed picture data is carried out in frame units thereafter to correctly decode the compressed picture data, it is sufficient that all data for decoding respective frame pictures are included within frames before and after the switching point between two series. Thus, switching between two series can be carried out without allowing deterioration of the picture quality to take place. Accordingly, if an approach is employed to transmit, every respective frame all data necessary for decoding the corresponding frame and of the series can be carried out in an arbitrary frame. In addition, information indicating data of frame pictures to be decoded in respective frames are respectively added to the leading portions of the respective frames as a header.

In more practical sense, in the case where a data train similar to the data train of the series A of FIG. 2A in which four frames are caused to be one set (group of pictures) is used as shown in FIG. 3B, it is sufficient to transmit only compressed picture data necessary for decoding corresponding frames in every respective frame as shown in FIG. 3C, or to copy compressed picture data of the sum sets of compressed picture data included within respective frames into the respective frames to transmit them as shown in FIG. 3D.

Initially, an explanation will be given in connection with the case where the transmission of only the compressed picture data necessary for decoding every respective frame and respective corresponding frames is being carried out. As shown in FIG. 3C, compressed picture data of frame picture $I_{A-1}$ which is I picture is first transmitted at frame $F_1$. In the case of the frame picture $I_{A-1}$, since decoding can be carried out by only this frame picture, compressed picture data consisting of only frame picture $I_{A-1}$ is transmitted at the frame $F_1$.

Subsequently at frame $F_2$, compressed picture data of frame picture $B_{A-2}$ which is the B picture is transmitted. When carrying out decoding of the frame picture $B_{A-2}$, frame picture $I_{A-1}$ of the frame forward in the point of time (hereinafter referred to as forward frame) is an I picture nearest to the frame picture $B_{A-2}$ and frame picture $P_{A-3}$ which is a P picture of the frame backward in the point of time (hereinafter referred to as backward frame) nearest thereto are required, three compressed picture data of frame pictures $I_{A-1}$, $B_{A-2}$ and $P_{A-3}$ are transmitted at the frame $F_2$. In addition, information indicating that the compressed picture data to be decoded is B picture is added to the leading portion of the frame $F_2$.

Further, compressed picture data of frame picture $P_{A-3}$ which is P picture is transmitted at frame $F_3$. When carrying out decoding of the frame picture $P_{A-3}$, since frame picture $I_{A-1}$ which is an I picture of the forward frame of the frame picture $P_{A-3}$ is required, two compressed picture data of frame pictures $I_{A-1}$, $P_{A-3}$ are transmitted at the frame $F_3$. In addition, information indicating that the compressed picture data to be decoded is P picture is added to the leading portion of the frame $F_3$.

Further, compressed picture data of frame picture $B_{A-4}$ which is a B picture is transmitted at frame $F_4$. When carrying out decoding of the frame picture $B_{A-4}$, frame picture $I_{A-5}$ of the backward frame which is an I picture nearest to the frame picture $B_{A-4}$ and frame picture $P_{A-3}$ which is a P picture of the forward frame nearest thereto are required. In this case, in order to correctly decode the frame picture $P_{A-3}$, frame picture $I_{A-1}$ is required. Accordingly, four compressed picture data of frame pictures $I_{A-1}$, $P_{A-3}$, $B_{A-4}$ and $I_{A-5}$ are transmitted at the frame $F_4$. In addition, information indicating that the compressed picture data to be decoded is B picture is added to the leading portion of the frame $F_4$.

In this way, compressed picture data necessary for carrying out decoding every frame are transmitted at the same time within the same frame. It is to be noted that a flag indicating validity of corresponding data may be added to the respective leading positions of the compressed picture data within respective frames in place of header data. Namely, flag 1 is added, as valid data, to compressed picture data to be decoded within the respective frames, and flag 0 is added to other overlapping data.

An explanation will now be given in connection with the case where compressed picture data of sum sets of compressed picture data included within respective frames are copied into respective frames to carry out transmission.

In this case, three compressed picture data of frame pictures $I_{A-1}$, $B_{A-2}$ and $P_{A-3}$ are transmitted as indicated at the frame $F_2$ of FIG. 3D at the frame $F_2$. In this transmission system, these compressed picture data are copied into frame $F_3$ as well as to transmit them, thereby making it possible to decode frame picture $P_{A-3}$ at the frame $F_3$. Moreover, at frame $F_4$, four compressed picture data of frame pictures $I_{A-1}$, $P_{A-3}$, $B_{A-4}$ and $I_{A-5}$ are transmitted as indicated at the frame $F_4$ of FIG. 3D. Also in this case, similarly to the above, these compressed picture data are copied into the frame $F_5$ as well to transmit them, thereby making it possible to decode frame picture $I_{A-5}$ at frame $F_5$. In this way, compressed picture data of plural frames transmitted at the same time at the first frame of two frames are copied into the second frame as they are to transmit them, whereby generation of the data train to be transmitted becomes easy. It should be noted that while, in the above-described embodiment, since picture data of four frames including two frames of a B picture are caused to be one set (group of pictures), compressed picture data of the same number of frames are transmitted in the state where they are copied for the respective two frames within the data train to be transmitted; if the number of frames of B pictures within one set is further increased, the number of frames in which compressed picture data of the same number of frames are copied is also further increased within the data train to be transmitted.

In the above-described compressed picture data transmission method, there is employed a scheme in principle such that the side for transmitting compressed data has memory for preserving compressed picture data of several frames to read out compressed picture data as occasion demands from the memory. For example, let suppose the case where the compressed picture data transmitting side is digital video tape recorder (DVTR) for recording and reproducing compressed picture data; an outline of the configuration of this DVTR is shown in FIG. 4.

Figure 4:
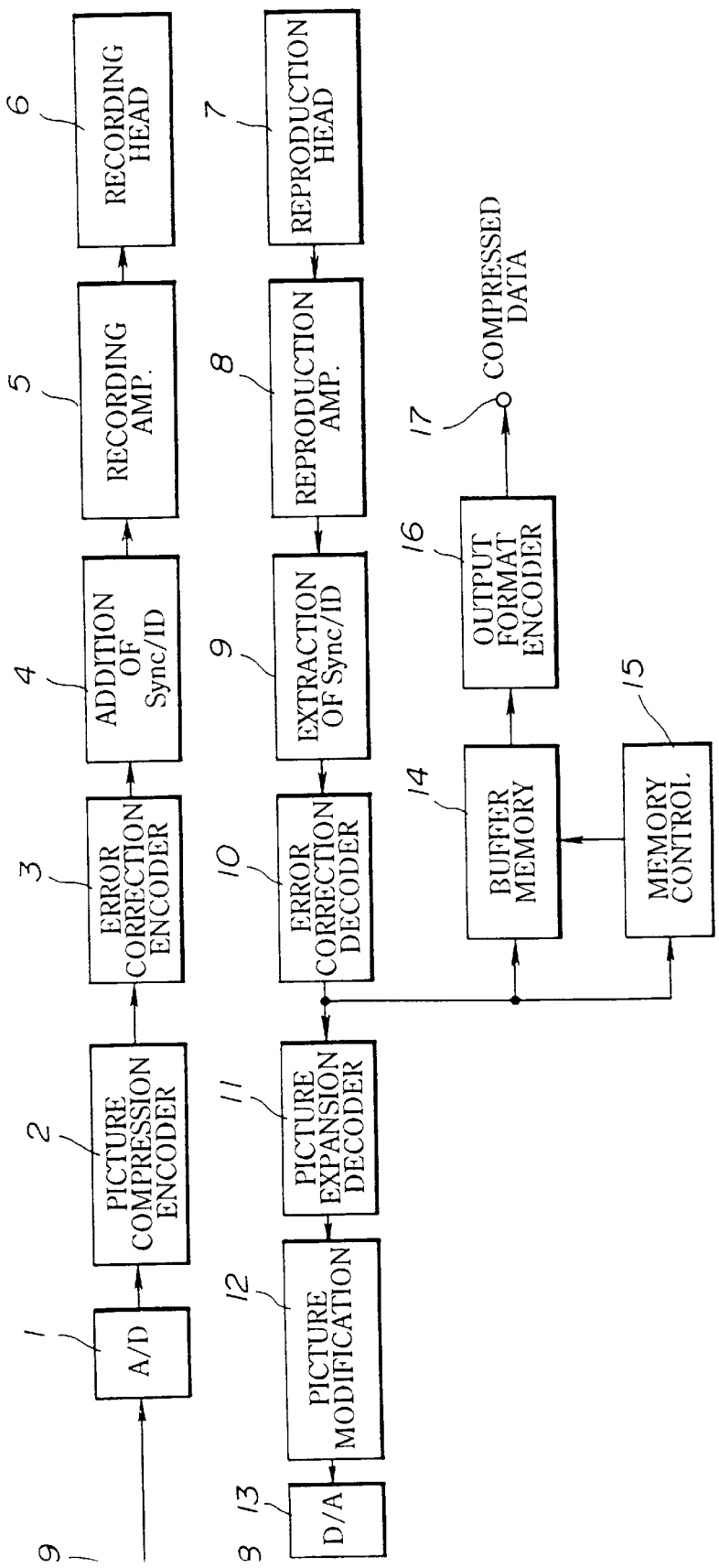
FIG. 4 is a block diagram showing a more practical configuration of a compressed picture data transmission apparatus according to this invention.

Compressed picture data written onto a recording medium (not shown) of FIG. 4 is read out by a reproduction head 7, and is then sent to a synchronizing information extractor (extraction element) 9 through a reproduction amplifier 8. At the synchronizing information extractor 9, additional information such as synchronizing signal and identification (ID) information, etc. is taken out from the sent compressed picture data. The compressed picture data synchronized by the synchronizing signal is sent to an error correction decoder 10. At the error correction decoder 10, error correction is implemented to the sent compressed picture data. This error corrected compressed picture data is sent to a picture expansion decoder 11, at which it is caused to undergo decoding, i.e., expansion processing. The picture data thus processed is sent to a picture modification circuit 12. At the picture modification circuit 12, modification of picture (data) is carried out. The picture data thus modified is converted into an analog signal by a D/A (Digital/Analog) converter 13, and is then outputted through a terminal 18. Moreover, an analog signal of picture data inputted to an A/D (Analog/Digital) converter 1 through a terminal 19 is converted into a digital signal, and is then sent to a picture compression encoder 2. At the picture compression encoder 2, compression encoding of the sent picture data is carried out. The compression-encoded picture data thus obtained is sent to an error correction encoder 3 at which the error code for error correction is added thereto. The error corrected compressed picture data is sent to a synchronizing information adding element 4 at which additional information such as a synchronizing signal and identification (ID) information is added. The compressed picture data outputted from the synchronizing information adding element 4 is outputted to a recording head 6 through a recording amplifier 5. The compressed picture data thus outputted is written onto a recording medium (not shown).

Further, the compressed picture data outputted from the error correction decoder 10 is also sent to a buffer memory 14 and a memory control circuit 15. By control from the memory control circuit 15, compressed picture data of several frames necessary for decoding respective corresponding frames wherein respective frames are taken out from the compressed picture data stored in the buffer memory 14. The compressed picture data thus taken out is sent to an output format encoder 16. This output format encoder 16 encodes compressed picture data sent to the respective frames to output them from the signal output terminal 17.

Write-in and read-out timings with respect to the buffer memory 14 of FIG. 4 is shown in FIGS. 5B–5D.

Initially, at the write-in timing shown in FIG. 5B, picture data of four frames are first sequentially written into the buffer memory 14. Thereafter, in the case of the data train shown in FIG. 3B, at the timing shown in FIG. 5C, picture data of the fifth frame is written into the buffer memory 14, and compressed picture data written into the buffer memory 14 are sequentially read out at the same time from the frame $F_1$ as the data train is to be transmitted. In addition, in the case of the data train shown in FIG. 3C, compressed picture data written in the buffer memory 14 are read out at the timing shown in FIG. 5D.

It is to be noted that the read-out timing shown in FIG. 5C may be a timing such that the picture data of the third frame is written into the buffer memory 14, and compressed picture data written in the buffer memory 14 is read out therefrom at the same time.

In this case, the receiving the side for receiving data train outputted from the signal output terminal 17 of FIG. 4 discriminates between data to be decoded and the overlapping data on the basis of header information. If the receiving side is the recorder, it serves to eliminate overlapping data from the received data train to carry out the recording. On the other hand, if the receiving side is the decoder, it serves to carry out decoding in accordance with the series of the received data trains.

In the above-described embodiment, compression pressing is carried out in advance at the picture data transmitting side so that switching between series can be carried out. An explanation be given below in connection with the case where there is employed, as a second compression picture data transmission method different from the above, a method of compression-processing picture data at the time of switching between a series to transmit picture data in the state where picture data is compressed only at a corresponding portion so that the picture before and after the switching point between series can be completely decoded.

FIGS. 6A to 6C are views for explaining the second compressed picture data transmission method. The series A and the series B shown in the FIGS. 6A and 6B mentioned above are series similar to the series A and the series B shown in FIGS. 2A and 2B. In this compressed picture data transmission method, in the case where the series A and the series B are caused to undergo switching from the series A to the series B at the switching point P of the fourth frame, compressed picture data of frame picture $I_{B-2}$ and frame picture B-$_{B-3}$ are also caused to be included within one frame in order to decode frame picture $P_{B-4}$ immediately after the switching point P of the series B.

Figure 7:
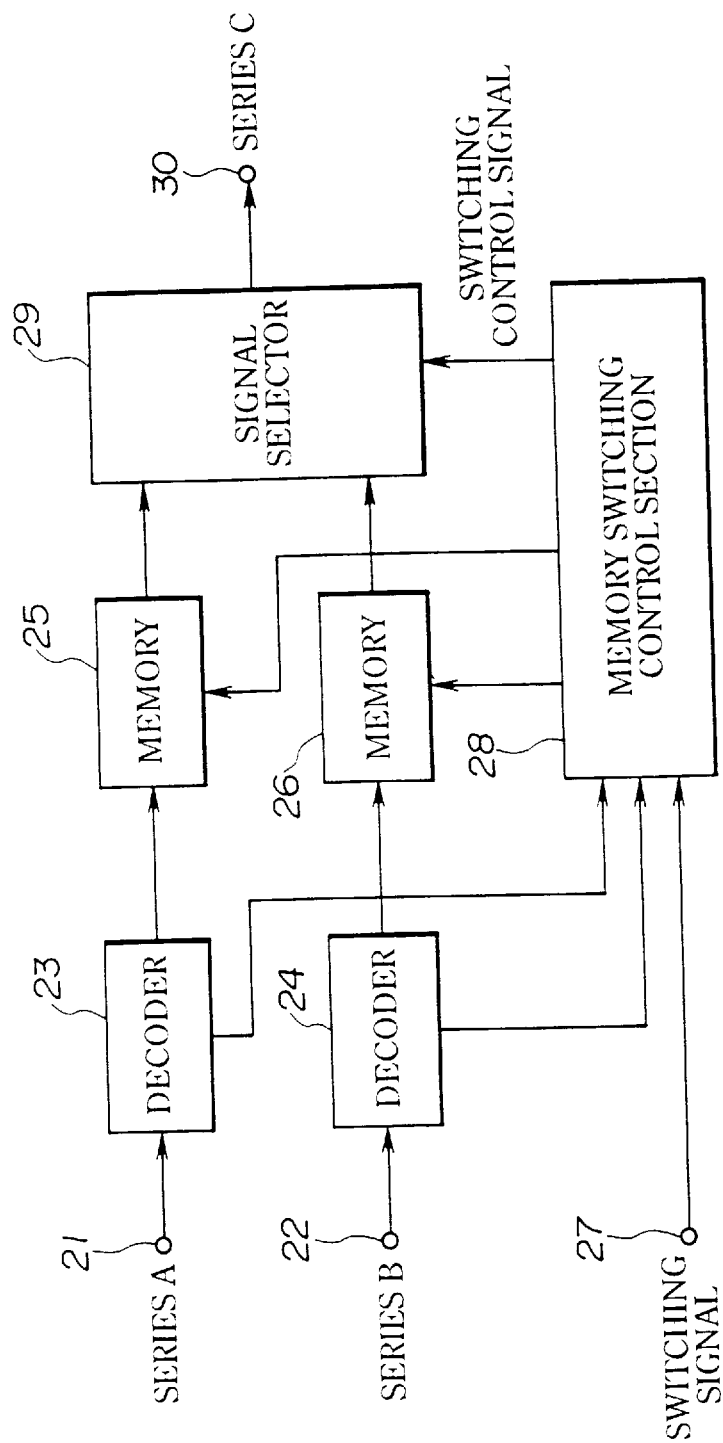
FIG. 7 is a view showing outline of the configuration for switching of compressed picture data.

Moreover, outline of the configuration of a circuit for switching of compressed picture data in the second compressed picture data transmission method is shown in FIG. 7.

Initially, the data train of the series A is inputted from a signal input terminal 21, and the data train of the series B is inputted from a signal input terminal 22. The data train of the series A is sent to a decoder 23, and the data train of the series B is sent to a decoder 24, at which there is carried out discrimination as to whether compressed picture data of respective frame pictures within the data trains are and I picture, B picture or P picture. Respective discrimination results outputted from the decoders 23, 24 are sent to a memory switching control section 28. In addition, the data trains sent to the decoders 23, 24 are respectively written into memories 25, 26, and are stored there. At this time, the memories 25, 26 function as a delay circuit.

In this case, the memory switching control section 28 is supplied with a switching signal inputted from a switching signal input terminal 27. The memory switching control section 28 outputs a switching control signal to the memories 25, 26 and a signal selector 29 on the basis of the supplied switching signal. From these memories 25, 26, compressed picture data stored therein are read out on the basis of a switching control signal from the memory switching control section 28. The compressed picture data which has been read out are sent to the signal selector 29. At the signal selector 29, the sent compressed picture data is outputted after having undergone switching on the basis of the switching control signal from the memory switching control section 28. Thus, the data train of the series C is outputted from a signal output terminal 30.

Write-in and read-out timings of compressed picture data with respect to the memories 25, 26 at this time are shown in FIGS. 8B to 8E.

FIG. 8B shows write-in timing of compressed picture data with respect to the memory 25, and FIG. 8C shows read-out timing of compressed picture data with respect to (from) the memory 25. Moreover, FIG. 8D shows write-in timings of compressed picture data with respect to the memory 26, and FIG. 8E shows read-out timings of compressed picture data with respect to (from) the memory 26. Namely, in the case where the switching signal is inputted at time $Q_1$ of the fourth frame, compressed picture data are respectively read out from the memories 25, 26. Thus, compressed picture data of the series A are transmitted as a transmit data train. Thereafter, a switching control signal is sent from the memory switching control section 28 to the signal selector 29 of FIG. 7 at a time three frames later from the time point when the switching signal is inputted, i.e., the time $Q_2$ of the seventh frame. Thus, the transmit data train is switched to frame picture $P_{B-4}$ which is compressed picture data of the series B. At this time, compressed picture data of frame picture $I_{B-2}$ and frame picture $B_{B-3}$ for decoding the frame picture $P_{B-4}$ are also transmitted within the same frame as that of the compressed picture data of the frame picture $P_{B-4}$. Then, header data indicating data to be decoded (compressed picture data of frame picture $P_{B-4}$) is added to the leading portions of respective frames. The header data to data already obtained are transmitted. Alternatively, data indicating validity of corresponding data are added to the leading portions of respective data within respective frames. The validity data to data already obtained are transmitted.

As described above, in the first compressed picture data transmission method and the second compressed picture data transmission method, switching between compressed picture data is carried out at the transmission path.

For example, in the case where compressed picture data is reproduced from a recording medium in which random-access can be carried out as in the case of a disc recorder using a disc as a recording medium, in a more practical sense, in the case where jumping from an arbitrary frame picture to another arbitrary frame picture is carried out to conduct continuous reproduction, since the sequence of compression algorithm becomes discontinuous, a phenomenon similar to switching takes place. Also in this case, if the above-described compressed picture data transmission method is used, it is possible to avoid that data becoming discontinuous.

What is claimed is:

1. A method for transmitting compressed picture data for carrying out in every frame transmission of picture data compressed using frame correlation, comprising the steps of:

(a) transmitting in every frame compressed picture data of a first kind and (b) transmitting at the same time in the same frame compressed picture data of a second kind necessary for decoding said compressed picture data of said first kind.

2. A method for transmitting compressed picture data as set forth in claim 1, further comprising the step of:

copying in plural successive frames compressed picture data sum sets of compressed picture data included within the respective frames into plural successive frames for transmitting.

3. A method for transmitting compressed picture data as set forth in claim 1, further comprising the steps of:

switching between two series of trains of picture data compressed by using frame correlation;

transmitting said two series of picture data trains before and after a switching point between said two series of compressed picture data; and inserting said compressed picture data of said second kind necessary for decoding said compressed picture data of said first kind of the respective frames into the respective data trains of said two series of switched compressed picture data.

4. A method for transmitting compressed picture data as set forth in claim 3, further comprising the step of:

allocating, within the respective one frame before and after said switching point, compressed picture data of said second kind necessary for decoding said compressed picture data of said first kind.

5. A compressed picture data transmission apparatus comprising:

a decoder for judging inputted first and second picture signals compressed by using frame correlation;

first and second memories for temporary storing said first and second compressed picture signals;

control means for controlling read-out operation of said first and second compressed picture signals from first and second memories on the basis of the kinds of first and second picture signals being judged by the decoder; and switching means for switching on the basis of a switching signal between said first and second compressed picture signals read-out from said first and second memories and for outputting the compressed picture signals obtained by said switching signal.

6. A compressed picture data transmission apparatus as set forth in claim 5, wherein the decoder is operable to judge the first and second picture signals at a predetermined switching point; and the control means is operable to control the memories so as to add to the first and second picture signals at the switching point one of the picture signals which is used for decoding said first and second compressed picture signals, and to read the compressed picture signals from the memories.

7. A compressed picture data transmission apparatus as set forth in claim 6, wherein the first and second compressed picture signals are inputted, every respective frame, to the first and second memories, and wherein said control means controls the memories so as to add to each of the frames of the first and second compressed picture signals at the switching point, at least one picture signal operable for decoding the corresponding first and second compressed picture signals and for reading the compressed picture signals out from the memories.

\* \* \* \* \*